(12) United States Patent
Unruh et al.

(10) Patent No.: US 7,719,558 B1
(45) Date of Patent: May 18, 2010

(54) APPARATUS AND METHOD TO GENERATE A HORIZONTAL SYNCHRONIZATION SIGNAL FOR A PRINTER

(75) Inventors: Gregory Lee Unruh, Boise, ID (US); Douglas G. Keithley, Boise, ID (US)

(73) Assignee: Marvell International Ltd. (BM)

( * ) Notice: Subject to any disclaimer, the term of this patent is extended or adjusted under 35 U.S.C. 154(b) by 0 days.

(21) Appl. No.: 12/173,324

(22) Filed: Jul. 15, 2008

Related U.S. Application Data

(60) Provisional application No. 60/950,479, filed on Jul. 18, 2007.

(51) Int. Cl.
  *B41J 2/435* (2006.01)
  *B41J 2/47* (2006.01)
(52) U.S. Cl. .................. 347/235; 347/250
(58) Field of Classification Search ........... 347/225, 347/229, 234, 235, 247–250; 359/204.1
See application file for complete search history.

(56) References Cited

U.S. PATENT DOCUMENTS

| | | | | |
|---|---|---|---|---|
| 5,966,231 | A | * 10/1999 | Bush et al. | 359/204.1 |
| 6,856,338 | B2 | * 2/2005 | Takahashi et al. | 347/225 |
| 7,515,169 | B2 | * 4/2009 | Komiya et al. | 347/247 |

\* cited by examiner

*Primary Examiner*—Hai C Pham

(57) ABSTRACT

Systems and methods are disclosed for determining and generating horizontal synchronization signals for a laser printer having a multi-facet rotating mirror. Each horizontal synchronization signal is determined based on measurements of the facets. The measurements are reflective of the configuration of the mirror and may be acquired using one horizontal synchronization sensor. Respective pseudo horizontal synchronization signals may be generated for multiple emitters based on the measurements obtained with the single horizontal synchronization sensor.

46 Claims, 5 Drawing Sheets

APPARATUS AND METHOD TO GENERATE A HORIZONTAL SYNCHRONIZATION SIGNAL FOR A PRINTER

RELATED APPLICATION

This application claims the benefit of U.S. Provisional Application No. 60/950,479, filed on Jul. 18, 2007, which is incorporated herein by reference.

BACKGROUND

1. Technical Field

The present disclosure relates to the field of laser printers, and more particularly to determining and generating a horizontal synchronization signal for a laser printer having a multi-facet rotating mirror.

2. Related Art

The printing process of a laser printer typically includes pressing or rolling a photoreceptor drum over a sheet of paper or other print media to transfer an image from the photoreceptor drum to the print media. In some laser printers the image is first transferred from the photoreceptor drum to a rotating belt, and then from the belt to the print media. In either case, an emitter emits successive laser beam signals to "write" successive lines of the image on the photoreceptor drum as it rotates.

In most laser printers, a system of lenses and mirrors direct the laser beam signals from the emitter to, and across, the photoreceptor drum. Each successive laser beam signal writes a line of static charge, corresponding to a line of the image, on the photoreceptor drum. The emitter emits each laser beam signal based on respective streams of image line data received from an image processor. Successive lines are written to the photoreceptor drum as it rotates and as the emitter receives a stream of image line data for each line. In a color printer, there may be several rotating drums, each receiving a respective laser beam signal from a respective emitter by way of the system of lenses and mirrors.

A color tandem laser printer has multiple (e.g., four) photoreceptor drums in line for transferring respective print colors to the print media, either directly or by way of belts. A color tandem laser printer may have one or more multi-facet, polygonal rotating mirror(s) for directing multiple laser beam signals, from multiple emitters (e.g., four), to the (respective) photoreceptor drums. Each emitter receives its own stream of image line data for turning its laser beam on and off as the laser beam sweeps across the respective photoreceptor drum. To print an image accurately, the beginning of each laser beam signal must be aligned with the beginning (i.e., edge) of a print line when the emitter is receiving the image line data. In this regard, the streams of image line data that are communicated to each emitter are initiated based on respective timing signals (sometimes referred to as "horizontal synchronization signals") received from respective horizontal synchronization signal ("horizontal sync") sensors that are provided for each photoreceptor drum.

In most cases, each horizontal sync sensor is mounted on a circuit board near the beginning edge of its respective photoreceptor drum. As the mirror rotates, the laser beam is reflected off of a facet of the rotating mirror and sweeps toward the horizontal sync sensor and the photoreceptor drum. The horizontal sync sensor provides a horizontal synchronization signal when it is struck by the laser beam. The horizontal synchronization signal indicates that the laser beam is a known distance from the write area of the photoreceptor drum. Image line data to the respective emitter is initiated a predetermined time interval (corresponding to the known distance) after the horizontal synchronization signal is triggered.

In a color tandem laser printer more than one facet of a mirror may be used to reflect/direct laser beams to respective (e.g., 4) photoreceptor drums. Because there may be variations between the relative positions, angles, and/or lengths of the mirror facets (i.e., an imperfect multi-facet mirror), respective horizontal sync sensors and supporting circuitry are provided for each photoreceptor drum so that each horizontal synchronization signal is provided at the right time for writing a line of the image to the correct location on the photoreceptor drum. An improved approach is desirable.

BRIEF SUMMARY

The following embodiments relate to systems and methods for determining and generating a pseudo horizontal synchronization signal in place of having a horizontal sync sensor output an actual horizontal synchronization signal in a color tandem laser printer having a rotating photoreceptor drum. The color tandem laser printer has a multi-facet rotating mirror that reflects a laser beam to a beam detector as each facet is struck by the laser beam in turn. Thus, a series of reflected laser beams strike the beam detector. Measurement data of the mirror is determined based on beam detect signals provided by the beam detector. The pseudo horizontal synchronization signal is determined based on the measurement data. The measurement data is reflective of the mirror's configuration, including the relative positions, angles, and lengths of each mirror facet (that may vary due to manufacturing tolerances and other effects). The number of horizontal sync sensors for a rotating mirror in a laser printer may thus be reduced to the single horizontal sync sensor needed to acquire the measurement data.

In an embodiment an apparatus, which may be an application specific integrated circuit or other circuit, includes a detector to detect a laser beam reflected off of a rotating multi-facet mirror in a printer. The detector responsively generates a first signal having a first series of pulses. Each pulse in the first series of pulses corresponds to the laser beam reflecting off of a respective facet of the rotating multi-facet mirror, and striking the detector. The apparatus also includes an image processor that outputs image line data when the image processor detects a pulse in a second series of pulses. The second series of pulses is based on the first series of pulses. The apparatus may also include an emitter to output a laser beam signal that is based on the image line data, and a photoreceptor drum to receive the laser beam signal.

The apparatus may also include a circuit to receive the first signal and to determine a plurality of pseudo horizontal synchronization signals for communication to the image processor. The plurality of pseudo horizontal synchronization signals may include the second series of pulses. The circuit may also determine a delay interval for communicating one of the pseudo horizontal synchronization signals to the image processor. The delay interval may be determined to allow the circuit to determine a first pseudo horizontal synchronization signal. The circuit may determine respective pseudo horizontal synchronization signals for two or more of a plurality of emitters in the printer. In another version, the circuit may receive the first signal and determine only one pseudo horizontal synchronization signal for communication to the image processor, wherein the image processor outputs image line data to an emitter at least approximately when the image processor detects a pulse in the one pseudo horizontal synchronization signal.

The circuit may also determine a first delay interval for communicating the second series of pulses to the image processor. The image processor may also determine a second delay interval for outputting the image line data upon detection of a pulse in the second series of pulses. The second delay interval may be determined to substantially align a laser beam signal with an image area on a photoreceptor drum, wherein the laser beam signal is based on the image line data. The image processor may also determine the second delay interval based on a calibration result of a multi-emitter mirror system. A sum of the first delay interval and the second delay interval may be substantially equal to a time interval from when the detector detects the laser beam to when a laser beam signal strikes a beginning edge of a write line on a photoreceptor drum.

A method comprises one or more of the following acts: reflecting a laser beam off of facets of a rotating multi-facet mirror; generating a first signal having a first series of pulses, wherein each pulse in the first series of pulses corresponds to the laser beam reflecting off of a respective facet of the rotating multi-facet mirror and striking a detector; detecting a pulse in a second series of pulses and responsively outputting image line data, wherein the second series of pulses is based on the first series of pulses; determining a laser beam signal based on the image line data; directing the laser beam signal at a photoreceptor drum; determining a plurality of pseudo horizontal synchronization signals, wherein the plurality of pseudo horizontal synchronization signals includes the second series of pulses; determining a delay interval for communicating one of the plurality of pseudo horizontal synchronization signals to an image processor; determining respective pseudo horizontal synchronization signals for two or more of a plurality of emitters in a printer; determining a first delay interval for communicating the second series of pulses to an image processor; determining a second delay interval for outputting the image line data upon detection of a pulse in the second series of pulses; determining the second delay interval based on a calibration result of a multi-emitter mirror system; determining only one pseudo horizontal synchronization signal based on the first signal; and/or outputting the image line data at least approximately when a pulse in the one pseudo horizontal synchronization signal is detected. The second delay interval may be determined to substantially align a laser beam signal with an image area on a photoreceptor drum, wherein the laser beam signal is based on the image line data. A sum of the first delay interval and the second delay interval may be substantially equal to a time interval from when the laser beam is detected to when a laser beam signal strikes a beginning edge of a write line on a photoreceptor drum.

According to another embodiment, a computer readable storage medium has processor executable instructions to execute one or more of the following acts: generate a first signal having a first series of pulses, wherein each pulse in the first series of pulses corresponds to a laser beam reflecting off of a respective facet of a rotating multi-facet mirror and striking a detector; detect a pulse in a second series of pulses and responsively output image line data, wherein the second series of pulses is based on the first series of pulses; generate a laser beam signal based on the image line data; direct the laser beam signal at a photoreceptor drum; determine a plurality of pseudo horizontal synchronization signals, wherein the plurality of pseudo horizontal synchronization signals includes the second series of pulses; determine a delay interval for communicating one of the plurality of pseudo horizontal synchronization signals to an image processor; determine the one pseudo horizontal synchronization signal within a time period that corresponds to the delay interval; determine respective pseudo horizontal synchronization signals for at least two of a plurality of emitters in a printer; determine a first delay interval for communicating the second series of pulses to an image processor; determine a second delay interval for outputting the image line data upon detection of a pulse in the second series of pulses; determine only one pseudo horizontal synchronization signal based on the first signal; determine the second delay interval based on a calibration result of a multi-emitter mirror system; and/or output image line data at least approximately when a pulse in the one pseudo horizontal synchronization signal is detected. The second delay interval may be determined to substantially align a laser beam signal with an image area on a photoreceptor drum, wherein the laser beam signal is based on the image line data. A sum of the first delay interval and the second delay interval may be substantially equal to a time interval from when the laser beam is detected to when a laser beam signal strikes a beginning edge of a write line on a photoreceptor drum, wherein the laser beam signal is based on the image line data.

An apparatus may comprise one or more of the following: means for reflecting a laser beam off of facets of a rotating multi-facet mirror; means for generating a first signal having a first series of pulses, wherein each pulse in the first series of pulses corresponds to the laser beam reflecting off of a respective facet of the rotating multi-facet mirror and striking a detector; means for detecting a pulse in a second series of pulses and responsively outputting image line data, wherein the second series of pulses is based on the first series of pulses; means for generating a laser beam signal based on the image line data; means for directing the laser beam signal at a photoreceptor drum; means for determining a plurality of pseudo horizontal synchronization signals; means for determining a delay interval for communicating one of the plurality of pseudo horizontal synchronization signals to an image processor; means for determining respective pseudo horizontal synchronization signals for at least two of a plurality of emitters in a printer; means for determining a first delay interval for communicating the second series of pulses to an image processor; means for determining a second delay interval for outputting the image line data upon detection of a pulse in the second series of pulses; means for determining the second delay interval based on a calibration result of a multi-emitter mirror system; means for determining only one pseudo horizontal synchronization signal based on the first signal; and/or means for outputting image line data at least approximately when a pulse in the one pseudo horizontal synchronization signal is detected.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The preferred embodiments will now be described with reference to the attached drawings.

BRIEF DESCRIPTION OF THE DRAWINGS

FIG. 1(*b*) illustrates the directions of laser beam signals generated by the system of FIG. 1(*a*);

FIG. 1(*c*) illustrates a section of the system of FIG. 1(*a*) having the mirror rotated;

DETAILED DESCRIPTION OF THE PRESENTLY PREFERRED EMBODIMENTS

Figure 1A:
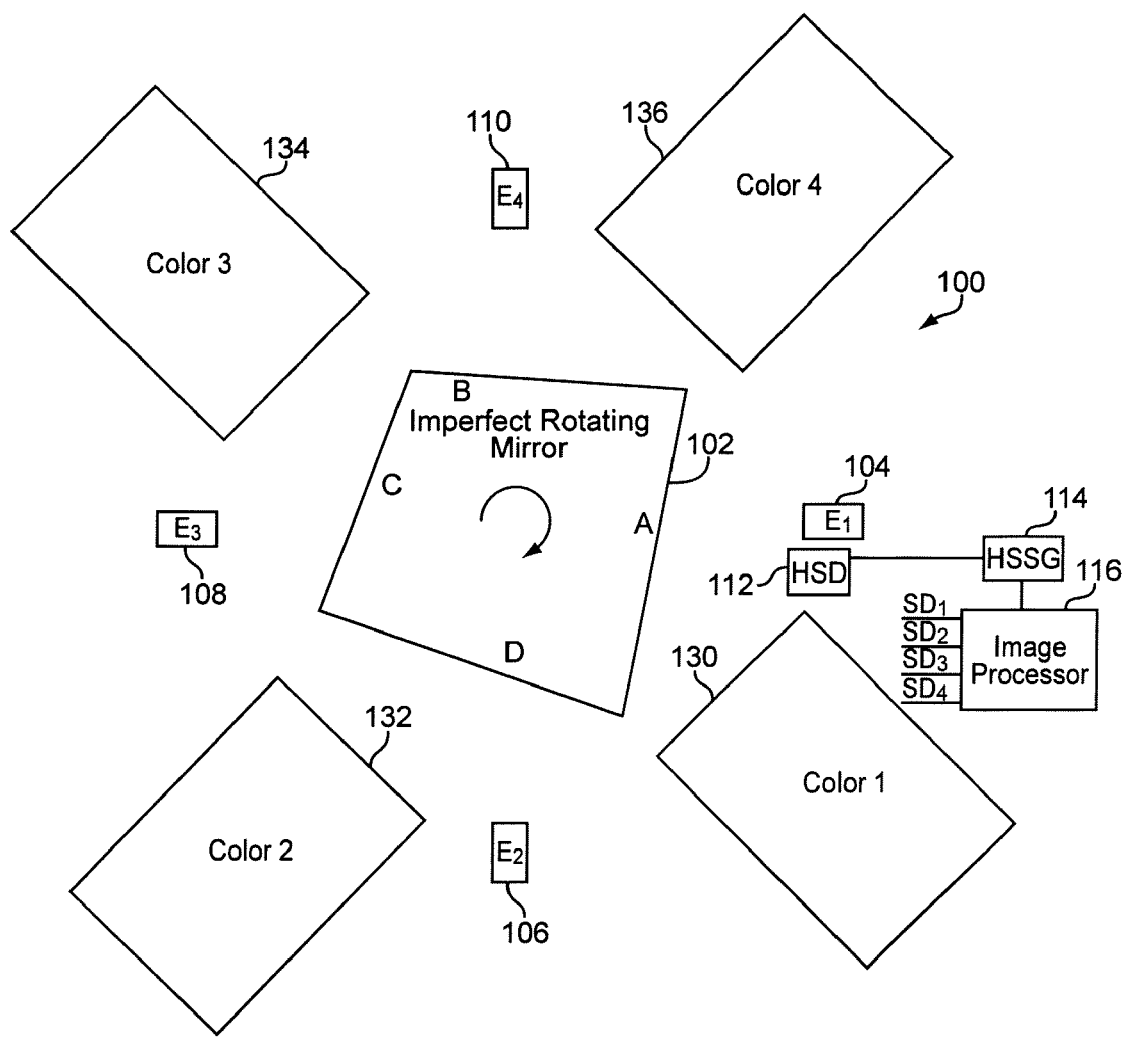
FIG. 1(*a*) illustrates a system for determining and generating a pseudo horizontal synchronization signal for a laser printer having a multi-facet mirror system, according to an embodiment.
FIG. 1(d) illustrates a delay between a horizontal sync sensor and the beginning of a print line on a photoreceptor drum of the system of FIG. 1(a)

The disclosure can be better understood with reference to the following drawings and description. The components in the figures are not necessarily to scale, emphasis instead being placed upon illustrating the principles of the invention. For example, the photoreceptor drums in a color tandem laser printer are represented in the drawings separate from one another, rather than "in-line", for clarity of explanation. Furthermore, although a four color tandem laser printer having a single rotating mirror is described, the principles of the invention are applicable to color tandem laser printers having other configurations, as will be understood by those skilled in the art. For example, the principles of the invention apply to four color tandem laser printers having two rotating mirrors, among many other types of color tandem laser printers. It is also noted that, in the figures, like referenced numerals designate corresponding parts or elements throughout the different views.

The embodiments below relate to a technique for first determining and then generating one or more pseudo horizontal synchronization signal(s) in a color tandem laser printer. Image line data is communicated to one or more respective emitter(s) in a multi-emitter, multi-facet mirror system based on the pseudo horizontal synchronization signal(s). The one or more pseudo horizontal synchronization signal(s) are determined based on a data signal received from a beam detector as the multi-facet mirror rotates, as explained below. The pseudo horizontal synchronization signal(s) are determined by a beam detector circuit and are based on the data signal.

As the multi-facet mirror rotates, a laser beam from an emitter is reflected off of a first facet. This laser beam may be referred to as a first reflected laser beam. When the beam detector detects the first reflected laser beam it communicates a first pulse (of the data signal) to a beam detector circuit. As the mirror continues to rotate, the next facet is struck by the laser beam and a second reflected laser beam sweeps toward and strikes the beam detector; the beam detector communicates a second pulse (of the data signal) to the beam detector circuit. The beam detector circuit continues to receive successive pulses as the mirror rotates. Based on time measurements between successive pulses of the data signal, a horizontal synchronization signal generator determines the one or more pseudo horizontal synchronization signal(s) for each of the one or more respective emitter/photoreceptor drum pair. It is noted that the horizontal synchronization signal generator may determine and generate the determined pseudo horizontal synchronization signal(s) based on not only the data signals, but also other data, as explained below.

As explained below, communication of image line data to an emitter is initiated based on the timing of a pulse of the determined pseudo horizontal synchronization signal. Each pseudo horizontal synchronization signal is determined based on a reflected laser beam being detected by the beam detector. Pulses in the pseudo horizontal synchronization signal indicate that the laser beam is a known distance from or at the beginning of a respective write line on the photoreceptor drum. As the mirror continues to rotate, line image data to an emitter/photoreceptor drum pair not having an actual beam detector is initiated based on pulses in the pseudo horizontal synchronization signal. It is noted that one or more pseudo horizontal synchronization signal(s) may be determined for a facet depending upon the number of emitters that simultaneously emit laser beams at the facet.

For each rotation, one or more (depending upon the number of emitters that rely on pseudo horizontal synchronization signals instead of an actual beam detector) pseudo horizontal synchronization signal(s) are provided when, or a predetermined time after, a laser beam is reflected off of a facet and strikes the single beam detector. Thereafter, pulses of the pseudo horizontal synchronization signal(s) indicate the positions of respective laser beam(s) relative to the beginning of write lines on respective photoreceptor drum(s). Using this technique, one or multiple pseudo horizontal synchronization signals may be determined by a system that includes a single beam detector (referred to below as a "horizontal sync detector") and a beam detector circuit (referred to below as a "horizontal sync signal generator"). Pulses of pseudo horizontal synchronization signals indicate the beginning of respective write lines and are used in place of actual beam detector(s), thereby reducing the number of beam detectors in a multi-emitter, multi-facet mirror system in a laser printer. The "pseudo" horizontal synchronization signals discussed above are referred to as horizontal synchronization signals through the remainder of the specification.

Turning to the drawings, FIG. 1(a) illustrates a system 100 for determining and generating a horizontal synchronization signal for a laser printer having a multi-emitter, multi-facet mirror system, according to an embodiment. Although a system having a single multi-facet mirror is illustrated in the drawings, the principles of the embodiments may be implemented in systems having two or more multi-facet mirrors, as will be apparent to those skilled in the art.

The system 100 includes a multi-facet rotating mirror ("mirror") 102 having four sides A, B, C, and D. Although an ideal multi-facet mirror is square, the drawings show an imperfect multi-facet mirror so that functions of the system 100 may be easily understood. The system 100 also includes four emitters $E_1$ 104, $E_2$ 106, $E_3$ 108, and $E_4$ 110. Each emitter emits a laser beam directed at the rotating mirror 102 as it rotates clockwise. The laser beams are reflected off each respective facet A, B, C, and D and sweep clockwise as the mirror rotates. For example, in the illustrated position of the mirror 102, the laser beam emitted from $E_1$ 104 is reflected off of facet A and swept down along a path that includes $E_1$ 104, a beam detector (labeled "horizontal sync detector" (HSD) 112), and a photoreceptor drum 130 that transfers a first color (Color 1) to a print media.

When the HSD 112 is struck by the laser beam, it communicates a data signal, referred to as a beam detect signal, to a circuit (referred to as a "horizontal sync signal generator" (HSSG) 114). As the rotating mirror 102 continues to rotate, laser beams from $E_1$ 104 are reflected off sides B, C, and D in turn (and subsequently A, B, C, D, A, . . . ). Each reflected laser beam sweeps down and strikes HSD 112, which communicates respective beam detect signals to the HSSG 114. As explained below, the HSSG 114 determines and generates one or more horizontal synchronization signal(s) and communicates them to an image processor 116. The image processor 116 generates image data signals $SD_1$, $SD_2$, $SD_3$, and $SD_4$ for each emitter $E_1$ 104, $E_2$ 106, $E_3$ 108, and $E_4$ 110, respectively. The image processor 116 initiates output of one or more of the image data signals $SD_1$, $SD_2$, $SD_3$, and $SD_4$ based on pulses of respective horizontal synchronization signal(s). The image data signals $SD_1$, $SD_2$, $SD_3$, and $SD_4$ control the emitters $E_1$ 104, $E_2$ 106, $E_3$ 108, and $E_4$ 110 for writing lines of an image, based on image line data, to the photoreceptor drums 130, 132, 134, and 136.

A four-facet, four emitter laser printer system 100 is illustrated for explanatory purposes only. One or more HSSG$^s$ may be implemented in other types of laser printer systems, including those having additional mirrors, a mirror having more or fewer facets, and/or systems having more or fewer emitters. For example, a HSSG may be implemented in a system having an eight-facet mirror and two emitters. It is understood that the claims of the present application are not limited to any particular laser printer system, mirror type, or mirror number, unless explicitly specified in the claim.

Figure 1B:
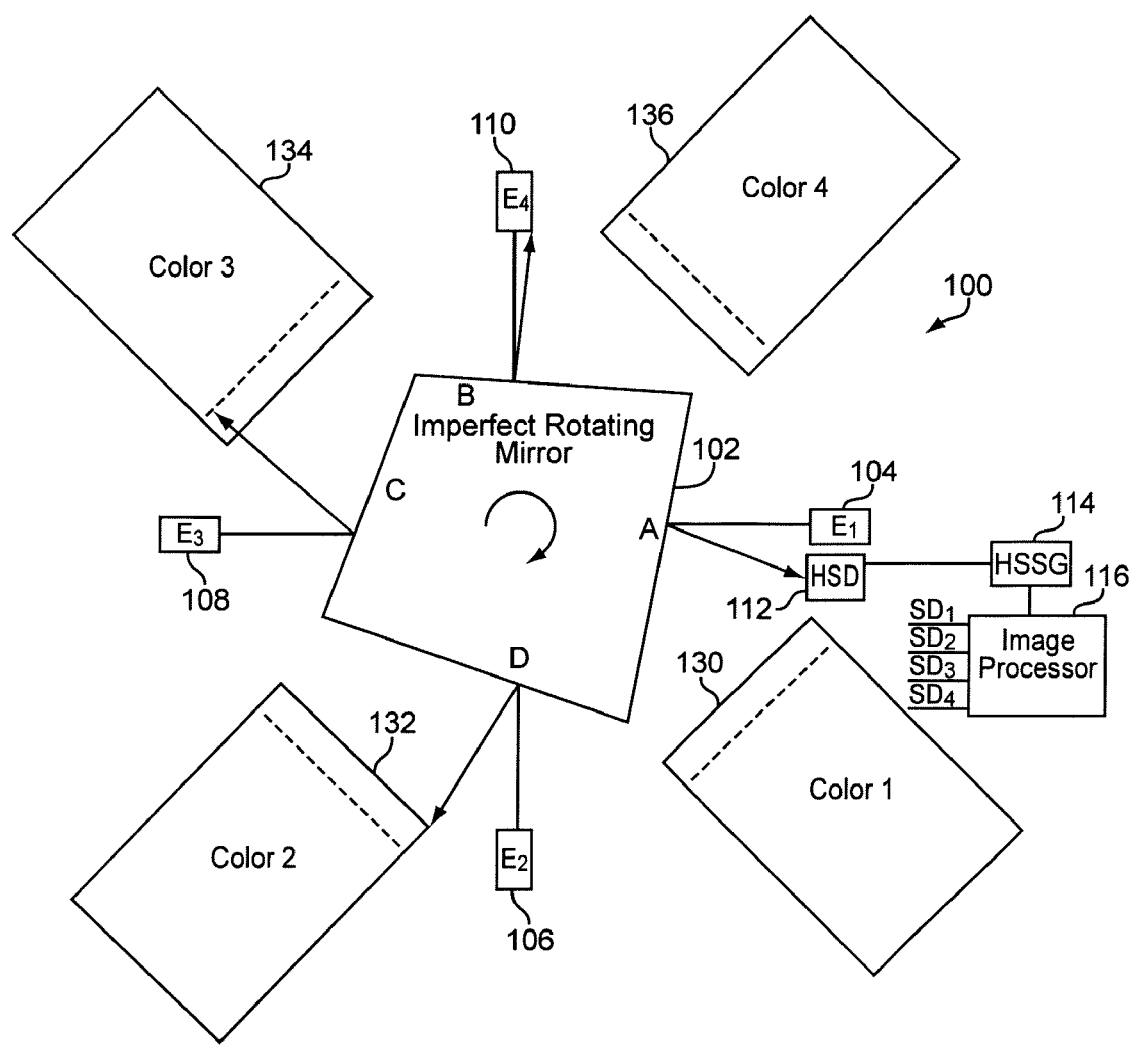

Referring again to FIG. 1(a), the lengths of the sides A, B, C, and D of the illustrated, exemplary mirror 102 are not all equal and the four angles between the sides are not all equal. For example, the length of side C is less than the lengths of sides A and D, and the angle between sides A and B is less than 90°. FIG. 1(b) illustrates how mirror imperfections result in laser beams being reflected in different directions with respect to their respective rotating drums 130, 132, 134, and 136. However, because the horizontal synchronization signals that are used to initiate output of the image data signals $SD_1$, $SD_2$, $SD_3$, and $SD_4$ are based on mirror measurement data, the start of each image data signal (SD) to its respective emitter $E_1$ 104, $E_2$ 106, $E_3$ 108, and $E_4$ 110 is aligned with accurate laser beam positions on the photoreceptor drums 130, 132, 134, and 136. The horizontal synchronization signals thus account for the configuration of the mirror 102, including any "defects", if defects exist or develop though use or because of some other reason. The illustrated defects are included for explanatory purposes only and are not to be read as limitations of the claims.

The method of determining the horizontal synchronization signal will now be discussed with reference to FIG. 1(b), which shows the rotating mirror 102 in the position where the laser beam from $E_1$ reflects off side A and strikes the HSD 112. In response to receiving the laser beam, the HSD 112 communicates a first beam detect signal to the HSSG 114. As the rotating mirror 102 continues to rotate, the laser beam from $E_1$ is reflected off of side B, sweeps down, and strikes the HSD 112. In response, the HSD 112 communicates a second beam detect signal to the HSSG 114. The rotating mirror 102 continues to rotate as the HSD 112 communicates third and fourth beam detect signals, corresponding to sides C and D, to the HSSG 114.

Figure 2:
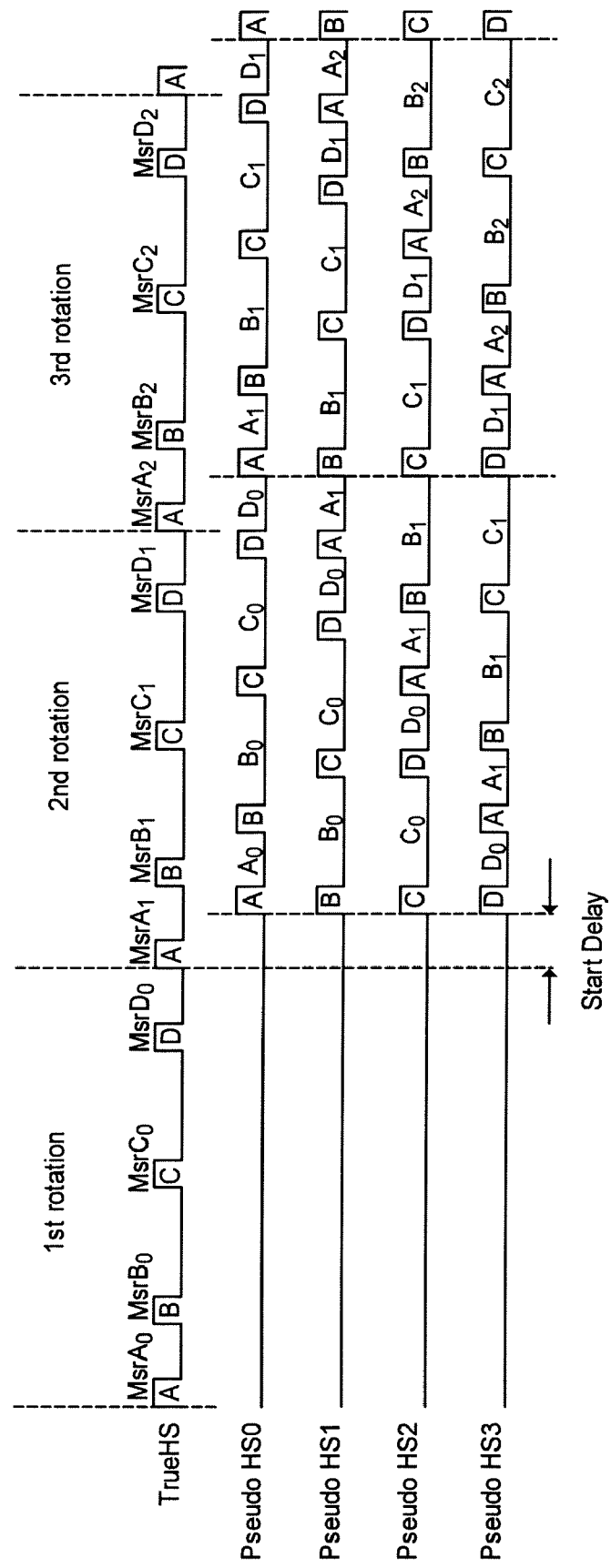
FIG. 2 shows an example of several pseudo horizontal synchronization signals that may be determined and generated by an embodiment of the horizontal sync signal generator of FIG. 1(a)

FIG. 2 shows an example of signals generated by the HSD 112 and the HSSG 114 of FIG. 1(a). The signal generated by the HSD 112 is identified as TrueHS. The HSD 112 generates pulse "A" when the laser beam from $E_1$ reflects off of side A and strikes HSD 112. The HSD 112 generates pulse "B" when the laser beam from $E_1$ reflects off of side B and strikes HSD 112. Similarly, the HSD 112 generates pulses "C" and "D" when the laser beam from $E_1$ reflects off of sides C and D, respectively, and strikes HSD 112. The TrueHS signal is communicated to the HSSG 114.

Based on the TrueHS signal, in the illustrated example the HSSG 114 determines four horizontal synchronization signals. The four horizontal synchronization signals are referred to as Pseudo HS0, Pseudo HS1, Pseudo HS2, and Pseudo HS3 in FIG. 2. The HSSG 114 determines the four horizontal synchronization signals based on the time measurements between TrueHS pulses. In FIG. 2, the time measurements are indicated by $MsrA_0$, $MsrB_0$, $MsrC_0$, and $MsrD_0$ for a first rotation of the mirror 102. $MsrA_0$ is the measured time between pulse "A" and pulse "B" of TrueHS. $MsrB_0$ is the measured time between pulse "B" and pulse "C". $MsrC_0$ and $MsrD_0$ are the measured times between the two subsequent pulses of TrueHS, respectively. The HSSG 114 determines the Pseudo HS0 signal based on the time measurements of the first rotation. The distance between the pulses of Pseudo HS0 ($A_0$, $B_0$, $C_0$, and $D_0$) directly correspond to the measured times of TrueHS ($MsrA_0$, $MsrB_0$, $MsrC_0$, and $MsrD_0$).

During the second rotation of the mirror 102, the laser beam from $E_1$ reflects off sides A, B, C, and D, in turn, and each reflected laser beam strikes HSD 112. HSD 112 communicates a second rotation TrueHS signal to HSSG 114. The second rotation TrueHS signal may have the same or different characteristics than the first rotation TrueHS signal. The second rotation TrueHS signal may be considered an updated measurement of the mirror 102, and may reflect changes in the rotational speed of the mirror 102 and/or other effects.

HSSG 114 measures the time between the pulses of the second rotation of the TrueHS signal and incorporates those measurements into the four Pseudo HS signals. As illustrated in the second rotation in FIG. 2, timing measurements from both the first rotation ($A_0$, $B_0$, $C_0$, and $D_0$) and the second rotation ($A_1$, $B_1$, $C_1$, and $D_1$) may be used to determine the Pseudo HS signals. Preferably, the latest received measurements are used. For example, referring to Pseudo HS2, $C_0$ and $D_0$ are used to determine the time between pulses "C" and "D", and "D" and "A", respectively, because $C_1$ and $D_1$ are not yet available. However, $A_1$ and $B_1$ are available (from measurements taken during the second rotation) to determine the time between pulses "A" and "B", and "B" and "C" (of Pseudo HS2), respectively. By continuing to measure the time between the pulses of TrueHS, the HSSG 114 may continue to generate updated horizontal synchronization signals Pseudo HS0, Pseudo HS1, Pseudo HS2, and Pseudo HS3.

Figure 1C:
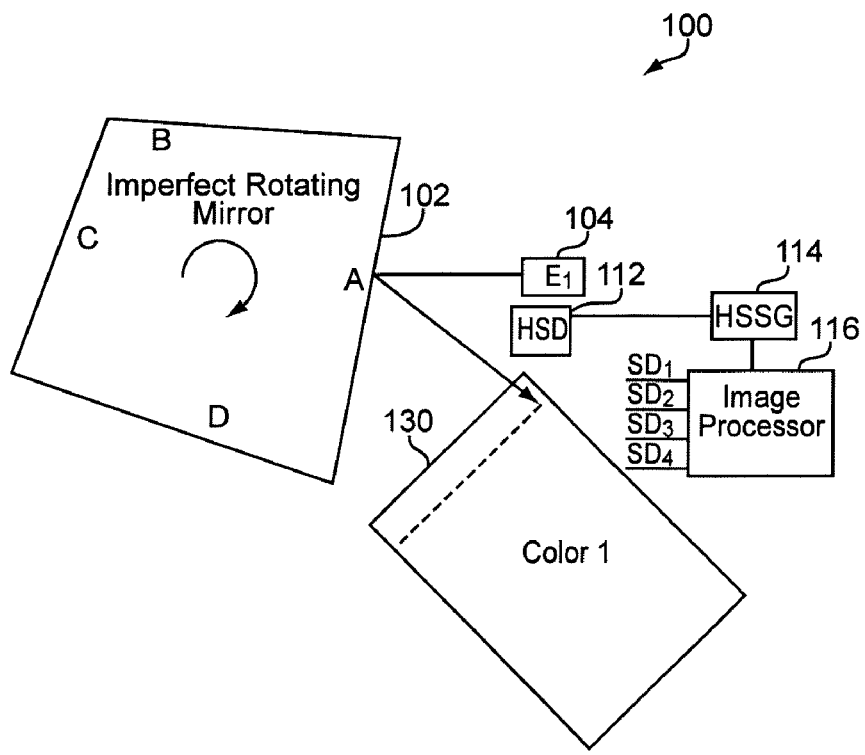

The HSSG 114 communicates Pseudo HS0, Pseudo HS1, Pseudo HS2, and Pseudo HS3 to the image processor 116. The image processor 116 initiates the communication of image line data $SD_1$, $SD_2$, $SD_3$, and $SD_4$ to each emitter $E_1$ 104, $E_2$ 106, $E_3$ 108, and $E_4$ 110, respectively, based on the pulses in each respective Pseudo HS signal. For example, when the laser beam from $E_1$ reflects off side A and strikes HSD 112 in the second rotation, the HSD 112 generates a TrueHS pulse "A" ($2^{nd}$ Rotation in FIG. 2). In response, the HSSG 114 initiates communication of the Pseudo HS signals to the image processor 116 (after a start delay, explained below). In response, the image processor 116 communicates image line data $SD_1$, $SD_2$, $SD_3$, and $SD_4$ to $E_1$ 104, $E_2$ 106, $E_3$ 108, and $E_4$ 110, respectively, based on the timing of the pulses in each Pseudo HS signal. In other words, the pulses of a Pseudo HS signal each represent that a respective reflected laser beam signal is in position to write a line of the image to the respective photoreceptor drum (assuming there is no start delay). FIG. 1(c) illustrates a section of the system of FIG. 1(a) having the mirror rotated to a position where a reflected laser beam (from emitter E1 104) is in position to begin writing a line of the image to a photoreceptor drum 130.

During each subsequent rotation, the HSSG 114 receives the TrueHS signal pulses from the HSD 112 and determines updated Pseudo HS signals. The updated Pseudo HS signals are communicated to the image processor 116 based on the timing of the next "A" pulse of TrueHS. FIG. 2 shows that Pseudo HS0 is the TrueHS signal delayed by one revolution (four facets), Pseudo HS1 is TrueHS delayed by three facets, Pseudo HS2 is TrueHS delayed by two facets, and Pseudo HS3 is TrueHS delayed by one facet.

Referring again to FIG. 1(b), due to mirror imperfections the reflected laser beams are each at different locations with respect to their respective photoreceptor drums 130, 132, 134, and 136. Based on the technique discussed above, the HSSG 114 generates horizontal synchronization signals so that the start of signal data (SD) from each emitter strikes the correct locations (e.g., start edges) on the photoreceptor drums 130, 132, 134, and 136, respectively (as is illustrated in FIG. 1(c) for photoreceptor drum 130).

Figure 1D:
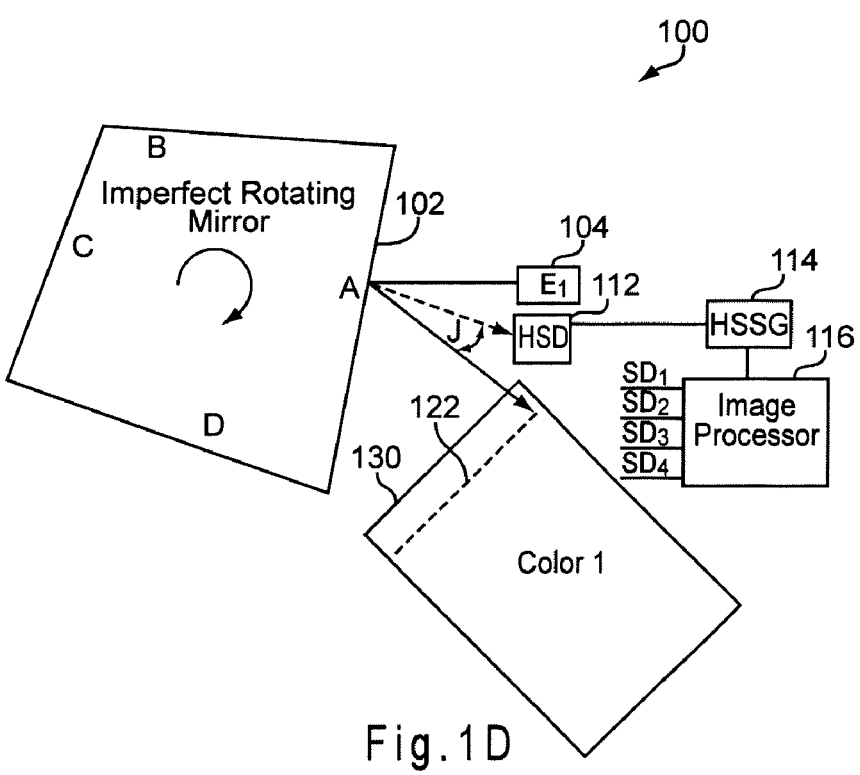

FIG. 1(d) illustrates a delay "J" between the HSD 112 (i.e., when the HSD 112 is struck by the reflected laser beam) and the beginning of a print line 122 on the photoreceptor drum 130. The delay "J" may include a first delay period determined by the HSSG 114 and a second delay period determined by the image processor 116.

As illustrated in FIG. 1(d), the HSD 112 is physically located outside the area of the photoreceptor drum 130. Therefore, there is a delay between when the HSD 112 is struck by a reflected laser beam and when the reflected laser beam is within an area of the photoreceptor drum 130. For a right-to-left scan, the right edge of the image (not necessarily the right edge of the photoreceptor drum 130) is a fixed distance from the HSD 112. The distance may be expressed as a number of pixels. For example, the right edge of the image may be 1000 pixels from the HSD 112. Therefore, the total delay "J" is 1000 pixels. The total delay may be divided between the HSSG 114 and the image processor 116. For example, the HSSG 114 may delay communicating a Pseudo HS signal to the image processor 116 by a portion of or all of the delay. If the HSSG 114 delays the Pseudo HS signal by 100 pixels, for example, the image processor 116 will delay the SD signal by 900 pixels. The image processor 116 may adjust the corresponding SD delay based on calibration results. For example, if it is determined that a test pattern is being printed 9 pixels to the right of an ideal location, the SD delay may be increased to 909 pixels so that the test pattern and printed images are printed accurately. A calibration test may be implemented by the system 100 to calibrate out mechanical/component tolerances that may cause shifts in image placement. The calibration result is communicated to the image processor 116 for determining its portion of the delay.

A HSSG 114 delay (referred to as "start delay" in FIG. 2) may be incorporated to allow the HSSG 114 to complete a pulse measurement before generating a Pseudo HS signal that requires the pulse measurement. For example, in FIG. 2 the Pseudo HS3 signal (second rotation) is dependent upon $MsrD_0$. The $MsrD_0$ measurement is not complete until the HSD 112 receives pulse "A" (TrueHS, $2^{nd}$ rotation). Including a start delay allows the HSSG 114 to complete the $MsrD_0$ pulse measurement and process the measurement data so that a pulse (pulse "D" of Pseudo HS3) can be generated at the correct time. In other words, including the start delay provides that the $MsrD_0$ data is available so that pulse "D" can be included in Pseudo HS3.

In addition to the above, the delay determined by the image processor 116 may also allow the HSSG 114 to align the first pulses of all four Pseudo HS signals. For example, the "B" pulse of Pseudo HS1 may be generated at the same time as the "A" pulse of Pseudo HS0 even if side B is tilted rearward (as illustrated in FIG. 1(b)). In this case, the image processor 116 will delay the $SD_2$ signal to account for the mirror's configuration. This technique will allow the HSSG 114 to initiate all four Pseudo HS signals at the same time, as is shown in FIG. 2 along the start delay indicator.

Figure 3:
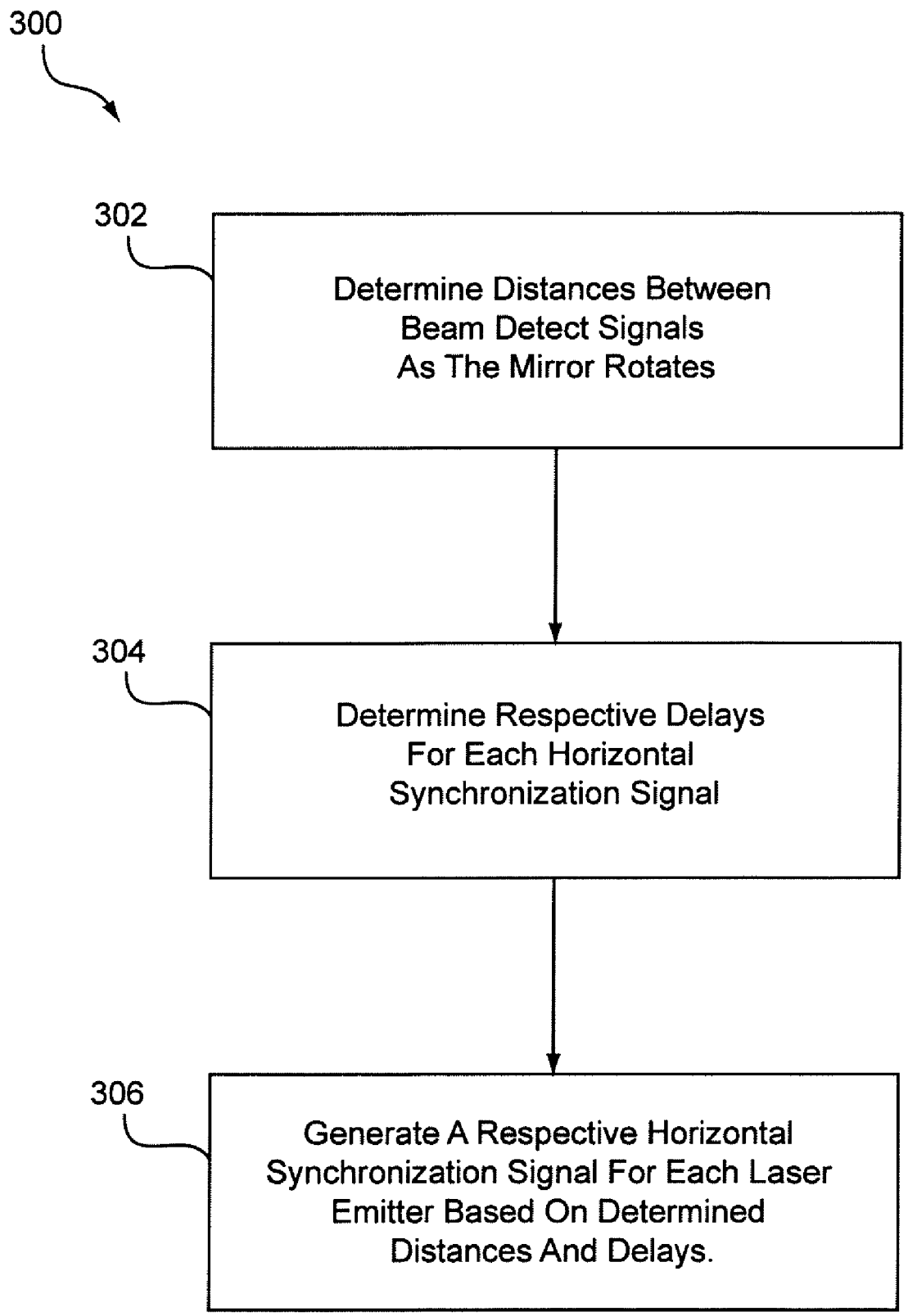
FIG. 3 shows acts for generating a pseudo horizontal synchronization signal, according to an embodiment.

FIG. 3 shows acts 300 that may be executed by a circuit or a system to generate a horizontal synchronization signal, according to an embodiment. The system determines the distances between beam detect signals that result from a laser beam being reflected off each mirror facet (Act 302) as the mirror rotates. The system may also determine a delay for each respective horizontal synchronization signal based on calibration tests and/or the configuration of the system. (Act 304). A horizontal synchronization signal is generated for each emitter in the system based on the measured distances and the delays (Act 306).

All of the discussion above, regardless of the particular implementation being described, is exemplary in nature, rather than limiting. Although specific components of the system 100 are described, methods, systems, and articles of manufacture consistent with the system 100 may include additional or different components. For example, components of the system 100 may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the system 100 may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system 100 may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. An apparatus comprising:
   a detector to:
      detect a laser beam reflected off of a rotating multi-facet mirror in a printer, and
      responsively generate a plurality of rotation signals, each rotation signal of the plurality of rotation signals having a series of pulses, wherein each pulse in the series of pulses corresponds to the laser beam reflecting off of a respective facet of the rotating multi-facet mirror, and striking the detector;
   a circuit to generate a plurality of pseudo horizontal synchronization signals in response to receiving at least one of the plurality of rotation signals, each pseudo horizontal synchronization signal of the plurality of pseudo horizontal synchronization signals including a series of pseudo pulses based on the series of pulses, wherein the circuit generates the plurality of pseudo horizontal synchronization signals using time measurements between pulses in the series of pulses, at least one of the time measurements being based on a rotation signal directly preceding the at least one of the plurality of rotation signals; and an image processor communicatively linked to the circuit and operable to output image line data when the image processor detects a pulse in the series of pseudo pulses.

2. The apparatus of claim 1 further comprising:

an emitter to output a laser beam signal that is based on the image line data; and a photoreceptor drum to receive the laser beam signal.

3. The apparatus of claim 1, wherein the time measurements are based on no more than two consecutive rotation signals of the plurality of rotation signals.

4. The apparatus of claim 3, wherein the circuit determines a delay interval for communicating at least one of the plurality of pseudo horizontal synchronization signals to the image processor.

5. The apparatus of claim 4 wherein the delay interval is determined to allow the circuit to determine a first pseudo horizontal synchronization signal.

6. The apparatus of claim 3 wherein the circuit determines respective pseudo horizontal synchronization signals for two or more of a plurality of emitters in the printer.

7. The apparatus of claim 3 wherein the circuit determines a first delay interval for communicating the series of pseudo pulses to the image processor, and the image processor determines a second delay interval for outputting the image line data upon detection of a pulse in the series of pseudo pulses.

8. The apparatus of claim 7 wherein the second delay interval is determined to substantially align a laser beam signal with an image area on a photoreceptor drum, wherein the laser beam signal is based on the image line data.

9. The apparatus of claim 7 wherein the image processor determines the second delay interval based on a calibration result of a multi-emitter mirror system.

10. The apparatus of claim 7 wherein a sum of the first delay interval and the second delay interval is substantially equal to a time interval from when the detector detects the laser beam to when a laser beam signal strikes a beginning edge of a write line on a photoreceptor drum, wherein the laser beam signal is based on the image line data.

11. The apparatus of claim 3 wherein the circuit and the image processor comprise an application specific integrated circuit.

12. The apparatus of claim 3 further comprising a multi-emitter mirror system having the detector, the image processor, and the circuit.

13. The apparatus of claim 1, wherein the circuit is configured to determine only one pseudo horizontal synchronization signal for communication to the image processor, wherein the image processor outputs image line data to an emitter at least approximately when the image processor detects a pulse in the one pseudo horizontal synchronization signal.

14. A method comprising:

reflecting a laser beam off of facets of a rotating multi-facet mirror;

generating a plurality of rotation signals, each rotation signal of the plurality of rotation signals having a series of pulses, wherein each pulse in the series of pulses corresponds to the laser beam reflecting off of a respective facet of the rotating multi-facet mirror and striking a detector;

generating a plurality of pseudo horizontal synchronization signals in response to receiving at least one of the plurality of rotation signals, each pseudo horizontal synchronization signal of the plurality of pseudo horizontal synchronization signals including a series of pseudo pulses based on the series of pulses, wherein the plurality of pseudo horizontal synchronization signals are generated using time measurements between pulses in the series of pulses, at least one of the time measurements being based on a rotation signal directly preceding the at least one of the plurality of rotation signals; and detecting a pulse in the series of pseudo pulses and responsively outputting image line data.

15. The method of claim 14 further comprising:

determining a laser beam signal based on the image line data; and directing the laser beam signal at a photoreceptor drum.

16. The method of claim 14, wherein the time measurements are based on no more than two consecutive rotation signals of the plurality of rotation signals.

17. The method of claim 16, further comprising determining a delay interval for communicating one of the plurality of pseudo horizontal synchronization signals to an image processor.

18. The method of claim 17 wherein the one pseudo horizontal synchronization signal is determined within a time period that corresponds to the delay interval.

19. The method of claim 16 further comprising determining respective pseudo horizontal synchronization signals for two or more of a plurality of emitters in a printer.

20. The method of claim 16 further comprising:

determining a first delay interval for communicating the series of pseudo pulses to an image processor; and determining a second delay interval for outputting the image line data upon detection of a pulse in the series of pseudo pulses.

21. The method of claim 20 wherein the second delay interval is determined to substantially align a laser beam signal with an image area on a photoreceptor drum, wherein the laser beam signal is based on the image line data.

22. The method of claim 20 wherein determining the second delay interval is based on a calibration result of a multi-emitter mirror system.

23. The method of claim 20 wherein a sum of the first delay interval and the second delay interval is substantially equal to a time interval from when the laser beam is detected to when a laser beam signal strikes a beginning edge of a write line on a photoreceptor drum.

24. The method of claim 14 further comprising:

determining only one pseudo horizontal synchronization signal based on the at least one of the plurality of rotation signals; and outputting the image line data at least approximately when a pulse in the one pseudo horizontal synchronization signal is detected.

25. An apparatus comprising:

means for reflecting a laser beam off of facets of a rotating multi-facet mirror;

means for generating a plurality of rotation signals, each rotation signal of the plurality of rotation signals having a series of pulses, wherein each pulse in the series of pulses corresponds to the laser beam reflecting off of a respective facet of the rotating multi-facet mirror and striking a detector;

means for generating a plurality of pseudo horizontal synchronization signals in response to receiving at least one of the plurality of rotation signals, each pseudo horizontal synchronization signal of the plurality of pseudo horizontal synchronization signals including a series of pseudo pulses based on the series of pulses, wherein the plurality of pseudo horizontal synchronization signals are generated using time measurements between pulses in the series of pulses, at least one of the time measurements being based on a rotation signal directly preceding the at least one of the plurality of rotation signals; and means for detecting a pulse in a series of pseudo pulses and responsively outputting image line data.

26. The apparatus of claim 25 further comprising:
means for generating a laser beam signal based on the image line data; and
means for directing the laser beam signal at a photoreceptor drum.

27. The apparatus of claim 25, wherein the time measurements are based on no more than two consecutive rotation signals of the plurality of rotation signals.

28. The apparatus of claim 27, further comprising means for determining a delay interval for communicating one of the plurality of pseudo horizontal synchronization signals to an image processor.

29. The apparatus of claim 28 wherein the one pseudo horizontal synchronization signal is determined within the delay interval.

30. The apparatus of claim 27 further comprising means for determining respective pseudo horizontal synchronization signals for at least two of a plurality of emitters in a printer.

31. The apparatus of claim 27 further comprising:
means for determining a first delay interval for communicating the series of pseudo pulses to an image processor; and
means for determining a second delay interval for outputting the image line data upon detection of a pulse in the series of pseudo pulses.

32. The apparatus of claim 31 wherein the second delay interval is determined to substantially align a laser beam signal with an image area on a photoreceptor drum, wherein the laser beam signal is based on the image line data.

33. The apparatus of claim 31 further comprising means for determining the second delay interval based on a calibration result of a multi-emitter mirror system.

34. The apparatus of claim 31 wherein a sum of the first delay interval and the second delay interval is substantially equal to a time interval from when the laser beam is detected to when a laser beam signal strikes a beginning edge of a write line on a photoreceptor drum, wherein the laser beam signal is based on the image line data.

35. The apparatus of claim 25 further comprising:
means for determining only one pseudo horizontal synchronization signal based on the at least one of the plurality of rotation signals; and
means for outputting image line data at least approximately when a pulse in the one pseudo horizontal synchronization signal is detected.

36. A computer readable storage medium having processor executable instructions to:
generate a plurality of rotation signals, each rotation signal of the plurality of rotation signals having a series of pulses, wherein each pulse in the series of pulses corresponds to a laser beam reflecting off of a respective facet of a rotating multi-facet mirror and striking a detector;
generate a plurality of pseudo horizontal synchronization signals in response to receiving at least one of the plurality of rotation signals, each pseudo horizontal synchronization signal of the plurality of pseudo horizontal synchronization signals including a series of pseudo pulses based on the series of pulses, wherein the plurality of pseudo horizontal synchronization are generated using signals using time measurements between pulses in the series of pulses, at least one of the time measurements being based on a rotation signal directly preceding the at least one of the plurality of rotation signals; and detect a pulse in the series of pseudo pulses and responsively output image line data.

37. The computer readable storage medium of claim 36 having processor executable instructions to:
generate a laser beam signal based on the image line data; and
direct the laser beam signal at a photoreceptor drum.

38. The computer readable storage medium of claim 36, wherein the time measurements are based on no more than two rotation signals of the plurality of rotation signals.

39. The computer readable storage medium of claim 38 having processor executable instructions to determine a delay interval for communicating one of the plurality of pseudo horizontal synchronization signals to an image processor.

40. The computer readable storage medium of claim 39 wherein the one pseudo horizontal synchronization signal is determined within a time period that corresponds to the delay interval.

41. The computer readable storage medium of claim 38 having processor executable instructions to determine respective pseudo horizontal synchronization signals for at least two of a plurality of emitters in a printer.

42. The computer readable storage medium of claim 38 having processor executable instructions to:
determine a first delay interval for communicating the series of pseudo pulses to an image processor; and
determine a second delay interval for outputting the image line data upon detection of a pulse in the series of pseudo pulses.

43. The computer readable storage medium of claim 42 wherein the second delay interval is determined to substantially align a laser beam signal with an image area on a photoreceptor drum, wherein the laser beam signal is based on the image line data.

44. The computer readable storage medium of claim 42 having processor executable instructions to determine the second delay interval based on a calibration result of a multi-emitter mirror system.

45. The computer readable storage medium of claim 42 wherein a sum of the first delay interval and the second delay interval is substantially equal to a time interval from when the laser beam is detected to when a laser beam signal strikes a beginning edge of a write line on a photoreceptor drum, wherein the laser beam signal is based on the image line data.

46. The computer readable storage medium of claim 36 having processor executable instructions to:
determine only one pseudo horizontal synchronization signal based on the at least one of the plurality of rotation signals; and
output image line data at least approximately when a pulse in the one pseudo horizontal synchronization signal is detected.

* * * * *